United States Patent
Cheruvathoor et al.

(10) Patent No.: US 12,239,155 B2
(45) Date of Patent: Mar. 4, 2025

(54) OVERNIGHT OATS AND METHOD OF MAKING SAME

(71) Applicant: General Mills, Inc., Minneapolis, MN (US)

(72) Inventors: Steve Cheruvathoor, Blaine, MN (US); Kenzi Clark, Minnetonka, MN (US); Julie A. Piasecki, Brooklyn Park, MN (US); Jie Sun, Plymouth, MN (US)

(73) Assignee: General Mills, Inc., Minneapolis, MN (US)

( * ) Notice: Subject to any disclaimer, the term of this patent is extended or adjusted under 35 U.S.C. 154(b) by 453 days.

(21) Appl. No.: 17/631,767

(22) PCT Filed: Oct. 7, 2020

(86) PCT No.: PCT/US2020/054548
§ 371 (c)(1),
(2) Date: Jan. 31, 2022

(87) PCT Pub. No.: WO2021/071925
PCT Pub. Date: Apr. 15, 2021

(65) Prior Publication Data
US 2022/0273006 A1    Sep. 1, 2022

Related U.S. Application Data

(60) Provisional application No. 62/912,448, filed on Oct. 8, 2019, provisional application No. 62/912,431, filed on Oct. 8, 2019.

(51) Int. Cl.
*A23L 7/117*    (2016.01)
*A23B 9/02*    (2006.01)
(Continued)

(52) U.S. Cl.
CPC .............. *A23L 7/117* (2016.08); *A23B 9/025* (2013.01); *A23B 9/10* (2013.01); *A23C 9/1315* (2013.01); *A23V 2002/00* (2013.01)

(58) Field of Classification Search
CPC .......... A23L 7/117; A23B 9/025; A23B 9/10; A23C 9/1315; A23V 2002/00
See application file for complete search history.

(56) References Cited

U.S. PATENT DOCUMENTS 2,466,261 A * 4/1949 Musher .............. A23C 19/0765
426/481
2,928,743 A   3/1960 Rutgers
(Continued)

FOREIGN PATENT DOCUMENTS

WO   WO 2020/005930   1/2020

OTHER PUBLICATIONS

"Overnight Muesli", Delish Knowledge, Jun. 6, 2019.

*Primary Examiner* — Anthony J Weier
(74) *Attorney, Agent, or Firm* — Jordan IP Law, LLC; Annette M. Frawley, Esq.

(57) ABSTRACT

Food compositions having a milk ingredient and steam-treated uncooked grains are described. The compositions provide a convenient alternative to overnight oats. The food compositions preferably include yogurt and uncooked steam-treated oats, which form a food product that has a shelf stability at 4° C. of at least 60 days. Methods of making and using such food compositions are also described wherein the grains are treated with steam just before being mixed with the milk ingredient.

20 Claims, 6 Drawing Sheets

(51) Int. Cl.
    *A23B 9/10*    (2006.01)
    *A23C 9/13*    (2006.01)

(56) References Cited

U.S. PATENT DOCUMENTS

| | | | | |
|---|---|---|---|---|
| 3,241,978 | A | * | 3/1966 | Hreschak ................ A23L 7/148 |
| | | | | 426/457 |
| 3,950,544 | A | | 4/1976 | Fridman |
| 5,055,309 | A | | 10/1991 | Saita et al. |
| 5,654,025 | A | | 8/1997 | Raghunath et al. |
| 5,762,989 | A | | 6/1998 | Savello |
| 5,820,903 | A | | 10/1998 | Fleury et al. |
| 5,979,300 | A | | 11/1999 | Donovan |
| 6,136,365 | A | * | 10/2000 | Burri ....................... A23L 7/117 |
| | | | | 426/619 |
| 6,399,122 | B2 | | 6/2002 | Vandeweghe et al. |
| 7,829,130 | B2 | | 11/2010 | Tossavainen et al. |
| 7,854,950 | B2 | | 12/2010 | Carroll et al. |
| 8,663,556 | B2 | | 3/2014 | Kariyama et al. |
| 9,040,107 | B2 | | 5/2015 | Bennett et al. |
| 2011/0250318 | A1 | * | 10/2011 | Innocenzi ................ A23L 2/66 |
| | | | | 426/72 |
| 2016/0143304 | A1 | * | 5/2016 | Havlik ................ A23C 9/1307 |
| | | | | 426/583 |
| 2016/0309732 | A1 | | 10/2016 | Gugger et al. |
| 2017/0105379 | A1 | | 4/2017 | Jackson |
| 2019/0343156 | A1 | | 11/2019 | Drori |

\* cited by examiner

OVERNIGHT OATS AND METHOD OF MAKING SAME

CROSS-REFERENCE TO RELATED APPLICATIONS

This application represents a National stage application of PCT/US2020/054548, filed Oct. 7, 2020, entitled "Overnight Oats", which claims the benefit of U.S. Provisional Patent Applications 62/912,431 and 62/912,448, both of which were filed on Oct. 8, 2019. The entire content of these applications are incorporated by reference.

BACKGROUND OF THE INVENTION

The present invention relates to food products and, more particularly, to overnight oats and similar food products using grains other than oats. In its method aspect, the present invention relates to methods for the preparation of overnight oats and similar food products that contain other grains.

Consumers are increasingly looking for healthy food options that can also provide convenience. Grains, such as oats, barley, corn, grain sorghum, rye, and wheat are examples of healthy food options. Grains contribute several benefits to a healthy diet, including contributing to fiber and providing protein. Beta glucan in oats has been associated with improved heart health and may contribute to lower blood cholesterol and triglycerides.

One popular food that uses oats as a central ingredient is what is sometimes referred to as "overnight oats." The popularity of overnight oats has been on the rise. While there is no set definition of what constitutes overnight oats, overnight oats are generally oats, such as rolled oats, that have been combined with a milk ingredient, such as yogurt, and allowed to soak, typically in refrigerated conditions for several hours. Sometimes the oats are soaked overnight to soften the oats before consumption the next morning. Overnight oats provide consumers with a way to eat oats that provides an eating experience that differs from oatmeal or porridge, where the oats are combined with a liquid, such as a milk ingredient or water, and then heated. One way that overnight oats differ from oatmeal is that the soaked, uncooked oats have a different, chewier texture than the cooked oats in oatmeal. In addition, overnight oats have a flavor that differs from oatmeal or porridge, providing a more uncooked oat flavor than oatmeal or porridge. Many consumers enjoy these differences, but overnight oats require pre-planning and several hours of soaking to achieve a consistency that such consumers enjoy. As a result, if a consumer forgets to combine oats with yogurt ahead of time, they generally miss out on having a serving of overnight oats at the desired time.

In addition, when oats are harvested and rolled, the oats are relatively clear of microorganisms. However, current rolled flaked oats have the potential risk of developing spoilage microorganisms. When the oats are stored at ambient temperatures or otherwise handled, microorganisms (e.g., yeast or mold) develop and, therefore, are present when the oats are mixed with the yogurt. As a result, homemade overnight oats only last one or two days after the oats are mixed with the yogurt since the oats bring in microorganisms that can compete with yogurt cultures within the yogurt and decrease shelf life of the overnight oats since there is undesired microbial growth (e.g., yeast or mold) over the refrigerated shelf life of the product. Even with strict ingredient microbial load control and a low microbial load processing environment, the commercialized overnight oat products do not maintain their quality attributes for more than a couple of weeks under refrigerated conditions. Another barrier to the industrializing of overnight oat products is the tendency for such products to have a significant viscosity increase over the product's shelf life. The viscosity increase contributes to the rapid decline of the eating qualities of the product.

Three available types of products attempt to provide a convenient version of overnight oats. However, each has significant drawbacks, leaving consumers without a convenient overnight oat option. A first type of product is a single serving container with oats, typically rolled oats, and other dry ingredients, designed to have a milk ingredient or other wet ingredient added by the consumer before consumption. This type of product still has the problem of requiring a soaking time after the addition of the milk ingredient and before consumption and is typically consumed within one-day due to microbial load growth limiting the product shelf-life.

A second type of product is a room temperature stable product that contains oats and a liquid ingredient. This type of product is generally thermally treated to provide shelf stability, which results in a flavor more like a cooked oatmeal or porridge rather than overnight oats. In addition, oats in this type of product tend to soften and/or disintegrate too much, resulting in a product that does not provide the desired texture of overnight oats.

A third type of product is a refrigerated product containing yogurt or yogurt-like product mixed with oats, usually rolled oats. This type of product is generally made by soaking oats in a non-milk liquid, such as water or fruit juice in order to soften the oats, then combining the soaked oats with yogurt or a yogurt-like product. However, this type of product tends to exhibit syneresis and/or undesired microbial growth (e.g., yeast or mold) over the refrigerated shelf life of the product. While the product is still generally safe to consume over a 60-day shelf life, these issues can negatively impact the flavor, appearance, and overall eating experience of the product.

Thus, while there are several food products that include oats and provide some level of convenience, such as those described above, there is still a consumer need for more options in foods that can provide benefits from oats or other grains yet also provide a convenient and pleasant eating experience. Specifically, there is a need for bulk, pre-processed overnight oats or similar grain-based products, as well as overnight grains that are provided in an individual serving package, each having a long shelf life.

SUMMARY

The present disclosure relates to convenient grain (e.g., oat, barley, rye, wheat, and the like) and milk ingredient products, such as dairy- or plant-based yogurt, providing an eating experience similar to overnight oats. Preferably, the food products are refrigerated and have a shelf stability at 4° C. of at least 60 days (e.g., at least 70 days) and include a food composition having a milk ingredient and uncooked, steam-treated grains, such as oats. The uncooked, steam-treated grains are preferably about 1% to about 50% and more preferably 5% to 25% by weight of the food composition. The food composition preferably includes a milk ingredient that has a viscosity of 15,000 to 45,000 and more preferably 20,000 to 40,000 cps as measured using a Brookfield viscometer, spindle 5, at 10 rpm for 25 seconds, at refrigerated temperature of 4° C.

The food product provided herein can optionally be enclosed in a container or package, such as a bulk package or an individual serving package, such as a cup-set yogurt.

A milk ingredient included in the food composition can be an animal-based or plant-based milk ingredient. In some embodiments, a milk ingredient included in the food composition can be a fermented milk, such as a yogurt which may have a live and active culture.

Preferably, the food composition comprises from 50% to 99% yogurt, and the yogurt is vat-set yogurt. Alternatively, the yogurt is cup-set and can be placed in glass jars or processed differently than vat-set yogurt to further reduce possible contamination of the product.

In some embodiments, the food composition can further include up to 10%, or up to 15% of a fruit ingredient or a nut ingredient. Preferably, the fruit and nuts have gone through a validated pasteurization process. The food composition optionally further comprises 0.005 to 0.5% citric acid or other organic acids, such as malic, citric, or lemon juice concentrate. The food composition optionally further comprises a preservative, such as potassium sorbate, sodium bicarbonate, potassium carbonate, benzoate, sorbate, natamycin or combinations thereof.

In some embodiments, a food can have a pH from 3.5 to 4.6, or preferably from 4.0 to 4.3.

In some embodiments, oats in the food composition provided herein can comprise oats having a protein content of at least 18% by weight of the oats. Preferably, the oats are uncooked steel-cut or rolled oats.

Also provided herein are methods of making a food product. A method provided herein includes treating a supply of unprocessed grains with steam to form uncooked steam-treated grains and mixing the uncooked steam-treated grains with a milk ingredient to form a food composition having 1 to 50% uncooked steam-treated grains, the food product having a shelf life of at least 60 days at 4° C. The milk ingredient in a food composition can have a viscosity of 15,000 to 45,000 and more preferably 20,000 to 40,000 cps as measured using a Brookfield viscometer, spindle 5, at 10 rpm for 25 seconds, at refrigerated temperature of 4° C., where the viscosity is stable for at least 35 days of refrigerated shelf life. The food product can have a shelf stability at 4° C. of at least 70 days. The steam is preferably supplied to the unprocessed grains at pressures in a range of up to 120 psig, preferably 15 to 45 psig and at temperatures in a range of about 100° C. to about 180° C., preferably from about 120° C. to about 145° C. The time the unprocessed grains are exposed to steam (i.e., residence time) can be from about 5 seconds to 30 minutes, preferably about 30 seconds to about 3 minutes. The mixing step is preferably performed in a blender, with a blending shaft rotating in a range of about 1.8 to 15 rpm. The microbial load in the unprocessed grains can drop to below 10 CFU/g after the treating with steam to produce the uncooked steam-treated grains. Preferably, the unprocessed grains are treated with steam just before the uncooked steam-treated grains are mixed with the milk ingredient. The food composition can be placed in a package. The resulting food product is refrigerated.

These and various other features and advantages will be apparent from a reading of the following detailed description.

BRIEF DESCRIPTION OF THE DRAWINGS

The invention will be better understood by reference to the following drawings.

DETAILED DESCRIPTION

Figure 1:
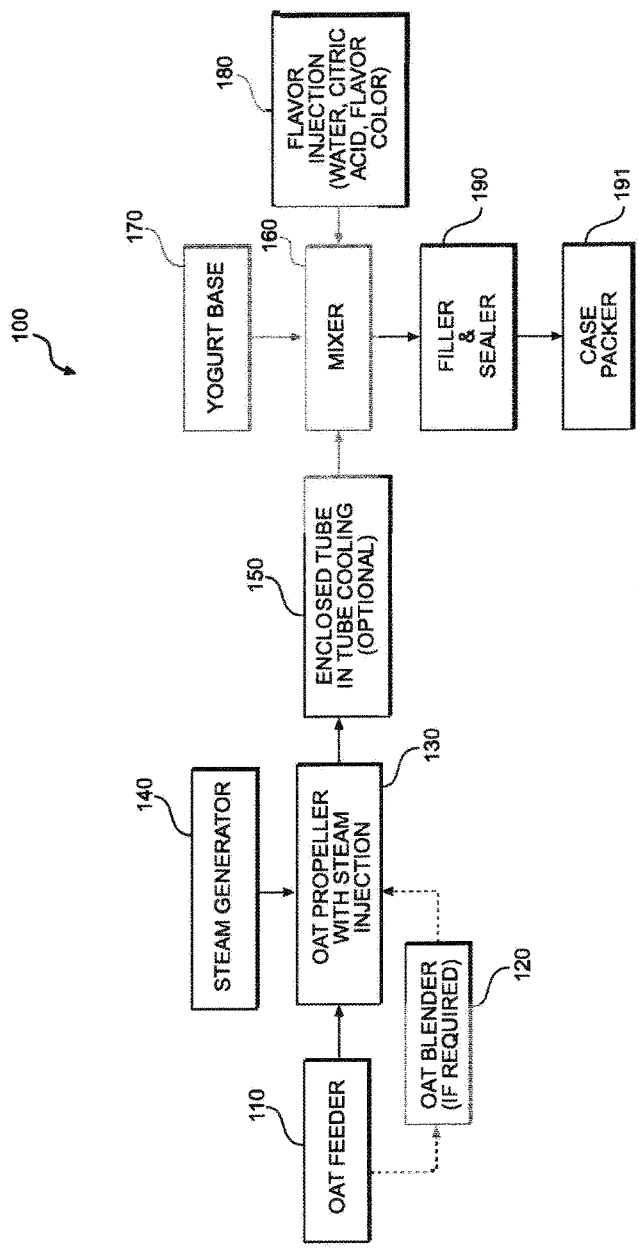
FIG. 1 is a schematic process flow diagram of one preferred embodiment of the present method of preparation with vat-set yogurt.

The present invention provides a convenient food product including a refrigerated food composition that has an eating experience, including a texture and a flavor, that is similar to overnight oats, without most or all of the disadvantages of the previously available products. It was discovered, and is disclosed herein, that unprocessed grains, such as oats, can be treated with steam and then combined with a milk ingredient, to result in a refrigerator stable food composition with a desired flavor and texture. Importantly, the steam treatment of grains forms a resulting refrigerated composition, in combination with the food composition acidity level, having a shelf stability at or below 4° C. of at least 60 days or at least 70 days.

As used herein, the term "shelf stability" or "shelf life," in reference to a product, indicates that the product is safe to eat and has an appearance and eating experience that does not significantly change over the indicated storage time and conditions. That is, a food product having a shelf stability or shelf life of at least 60 days at 4° C. is safe to eat over the 60 days when stored at 4° C. or below, and does not display significant changes in appearance (e.g., does not display significant syneresis, drying, or mold formation) or eating experience (e.g., does not display a significant change in texture or significant changes in flavor) over the same period when stored at the same conditions.

Food Product

Grains (e.g., oats, barley, corn, grain sorghum, rye, wheat, other grains, or a combination thereof) are included in a food composition provided herein in an amount of from about 1% to about 50%, and more preferably 5% to 25%, by weight of the food composition. Any species or grain variety suitable for consumption can be used in the food composition. For example, various cultivars and varieties of common oats (*Avena sativa*), red oats (e.g., *Avena byzantina*), black oats (e.g., *Avena strigosa*), Hungarian oats (*Avena orientalis*), naked oats, and other oat species (e.g., *Avena magna, Avena brevis*), or combinations thereof, are all suitable for use. In some embodiments, at least a portion (e.g., 10% to 100%, 30% to 80%, about 45% to about 60%, or about 50%) of the grains have protein content of at least 18% (e.g., at least 20%, or at least 22%) by weight. Oats having a protein content of at least 18% by weight are described in U.S. Patent Application Publication No. 2017/0105379, the contents of which are incorporated herein by reference in their entirety.

Preferably, the grains included in a food composition are steam-processed uncooked rolled or flaked grains. As used herein, the term "rolled oats" refers to oats that have been pressed into a flat shape relative to a hulled, but otherwise unprocessed, oat kernel. Rolled oats are typically produced by pressing oat kernels, e.g., between rollers, to achieve a more or less flattened kernel (e.g., flakes ranging from about 0.25 to about 1.8 mm thick, or about 0.35 to about 1.6 mm thick or preferably about 1.0 mm thick). In some cases, rolled oats are roasted either before or after being flattened, or can be roasted both before and after being flattened. Rolled oats are often identified as rolled oats, but can also be described as "porridge oats," "old fashioned oats," "whole oats," or "jumbo oats." Oat kernels are generally steamed to facilitate production of rolled oats, but are not subsequently stored under conditions that prevent growth of microorganisms. More details regarding oats are described in U.S. Provisional Patent Application Ser. No. 62/690,070, filed on Jun. 26, 2018, entitled, "Milk and Oat Food Product", the contents of which are incorporated herein by reference in their entirety. Other grains can be similarly processed to produce rolled or flaked grains that are similar to rolled oats.

A grain, such as a rolled or flaked grain, that has not been steam treated according to a method provided herein and has not been cooked is referred to as "unprocessed grain." As used herein, the term "cooked" with reference to a grain, refers to a grain that has been boiled in water or other liquid to produce a traditional cooked grain, porridge, oatmeal, or other product.

The term "steam-processed uncooked" (also sometimes referred to as "raw") as used herein, refers to a grain that has been steam-treated according to a method described herein, but not been boiled in water or other liquid to produce a traditional cooked grain, porridge, oatmeal, or other product. A steam-processed uncooked grain can be distinguished from a cooked grain as containing more ungelatinized starch relative to a cooked grain of the same type. For example, steam-processed uncooked rolled oats can be observed to have at least 70% of the starch content being ungelatinized relative to an unprocessed grain of the same type, while cooked rolled oats are observed to have less than 70% of the starch content being ungelatinized relative to an unprocessed grain of the same type. Ungelatinized starch content of a grain is measured as total enthalpy (J/g) as determined by differential scanning calorimetry (DSC). The percent of ungelatinized starch content in an uncooked steam-processed grain or a cooked grain relative to an unprocessed grain of the same type is calculated by measuring DSC total enthalpy of the steam-processed uncooked grain or cooked grain, respectively, and dividing it by DSC total enthalpy of the unprocessed grain of the same type, with the same type preferably being from the same manufacturer and/or batch. For example, if DSC total enthalpy of a steam-processed uncooked thick cut rolled oat is measured as 10 J/g, and DSC total enthalpy of an unprocessed thick cut rolled oat is measured as 12 J/g, then the ungelatinized starch content of the steam-processed uncooked thick cut rolled oat is 83% relative to the unprocessed thick cut rolled oat. Similarly, if DSC total enthalpy of a cooked instant rolled oat is measured as 5.5 J/g and DSC total enthalpy of an unprocessed instant rolled oat is measured as 8 J/g, then the ungelatinized starch content of the cooked instant rolled oat is 69% relative to the unprocessed instant rolled oat. See, FIG. 5 and FIG. 6.

In some embodiments, a steam-processed uncooked grain can be distinguished from a cooked grain as displaying a differential scanning calorimetry (DSC) total enthalpy that is higher than the DSC total enthalpy in a cooked grain of the same type. For example, uncooked steam-processed rolled oats can be observed to have a DSC total enthalpy of greater than 7 J/g, while cooked rolled oats are observed to have a DSC total enthalpy of 7 J/g or less. To measure DSC total enthalpy in a grain, a sample of the grain is prepared by grinding the sample in frozen form into a powder and placing a sufficient amount of the sample powder for analysis (e.g., about 10 mg for use on a TA DSC2500 Analyzer) in a stainless steel pan. If the sample has less than 50% moisture content (e.g., uncooked steam-processed grain or unprocessed grain), water is added to the pan to provide sufficient water to gelatinize any ungelatinized starch during analysis. For samples with at least 50% moisture (e.g., cooked grain or grain in a milk ingredient), no additional water is necessary. If a grain sample is in a milk ingredient (e.g., in yogurt), it is left in the milk ingredient. The sample in the steel pan is placed in a DSC analyzer and the temperature is brought to 0° C. at a rate of 40° C./min, followed by a hold at 0° C. for 2 minutes, then heat flow is measured during a temperature ramp at a rate of 10° C./min to 200° C. DSC total enthalpy is the total enthalpic area of a heat flow curve between 40° C. and 130° C.

In some embodiments, a steam-processed uncooked grain can be distinguished from a cooked grain as having a first DSC enthalpic peak onset temperature that is higher than the first DSC enthalpic peak of a cooked grain of the same type. For example, steam-processed uncooked rolled oats can be observed to display a first DSC enthalpic peak onset temperature above 50° C., while cooked rolled oats are observed to display a first DSC enthalpic peak onset temperature below 50° C.

It is to be understood that characteristics of steam-processed uncooked grains that distinguish them from cooked grains described above are to be compared under conditions that control for environmental differences. For example, DSC measurements for starch gelatinization, total enthalpy, and enthalpic peak onset should be measured using the same equipment and the same conditions for each of the tested samples.

While methods of manufacturing a food product have been described below using yogurt, any dairy-based milk ingredient or plant-based milk ingredient or combination of milk ingredients can be used. As used herein, a dairy-based milk includes any animal's milk (e.g., cow's milk, goat's milk, sheep's milk, and the like) or a product made from such a milk, such as cream, fermented milk (e.g., yogurt, kefir, or the like), powders that have been rehydrated, or any combination thereof. Plant-based milk ingredients can include any nut-based (e.g., coconut, almond, cashew, and the like), legume-based (soy, pea, and the like), grain-based (rice, oat, and the like, or other plant-based (e.g., hemp and the like) milk or a product made from such a milk. In some embodiments, a milk ingredient has a moisture content of 80% to 99% (e.g., from about 84% to about 98%) by weight. In some embodiments, a milk ingredient has a water activity of about 0.90 to about 1 (e.g., about 0.96 to about 0.99).

In some embodiments, a fermented milk ingredient, such as a yogurt, in a food product can include a live and active culture. A live and active culture can include one or more lactic acid-producing bacteria (e.g., *Lactobacillus del-*

*brueckii* subsp. *bulgaricus, Streptococcus thermophilus, Bifidobacterium lactis*, and the like). In some embodiments, lactic acid-producing bacteria can be selected for inclusion in a food composition. See, e.g., U.S. Pat. No. 7,854,950, the disclosure of which is incorporated herein by reference. For example, a yogurt or kefir can be made using any known technique prior to combining with oats. See, for example, U.S. Pat. No. 6,399,122, U.S. Patent Application Publication No. 2016/0309732, U.S. Pat. Nos. 5,820,903, 9,040,107, 3,950,544, 5,979,300, and 5,055,309, the disclosures of which are incorporated by reference herein. In another example, a milk ingredient can be strained or filtered prior to combining it with oats and any optional ingredients. See, for example, U.S. Pat. Nos. 7,829,130, 5,654,025, 5,762, 989, the disclosures of which are incorporated by reference herein.

A food composition provided herein has a pH of 4.8 or less (e.g., 4.6 or less, 4.5 or less, 3.5 to about 4.6, or about 4.0 to about 4.6). A pH of 4.8 or less helps to maintain stability at 4° C. or less. Preferably the pH is above 3.5 to provide a desirable taste. In some embodiments, a food composition can include an acidulant in order to achieve the desired pH. Acidulants suitable for use in a food composition include, for example, organic acids (e.g., citric acid, lactic acid, malic acid, and the like), acidic fruit juices or juice concentrates (e.g., lemon juice, lime juice, and the like), or acidic fruit pieces or purees.

In some embodiments, a food composition provided herein can contain inclusions in an amount of up to 25% and preferably about in an amount up to 10% by weight of the food composition. Inclusions suitable for use in the food composition include, for example, dried whole fruit or fruit pieces, nuts, seeds, confectionaries, or the like, or combinations thereof. A fruit and nut ingredient can be included in the food composition provided herein in a combined amount of up to about 10% by weight of the food composition. Preferably, inclusions have undergone a validated pasteurization process.

In some embodiments, the food composition provided herein can include other appropriate ingredients, such as colorants, flavorants, fibers (e.g., wheat bran, oat bran, oat fiber, soluble corn fiber, inulin, or the like), or preservatives (e.g., salts, potassium sorbate, sodium bicarbonate, potassium carbonate, sodium citrate, benzoate, sorbate, natamycin, and the like, or combinations thereof). However, in some embodiments, the food composition contains substantially no preservatives. As used herein, a preservative does not refer to components naturally occurring in milk ingredients (including cultures included in fermented milk), oats, fruit ingredients, or sweeteners suitable for use in the food composition provided herein, nor does a preservative refer to an acidulant as described below.

In some embodiments, the food composition provided herein can have a protein content of at least 5% (e.g., at least 6%, at least 7%, or at least 10%) by weight of the food composition. The protein content of the food composition provided herein can be adjusted by adjusting the amounts and types of ingredients included in the food composition. For example, increasing the amount of oats, especially oats having a protein content of at least 18%, can increase average protein content. In another example, protein content can be increased by using a milk ingredient having a relatively high protein concentration, such as a strained yogurt (e.g., "Greek" yogurt).

In some embodiments, the food composition provided herein can have a fiber content of at least 1.5% (e.g., at least 2%, or at least 2.5%) by weight of the food composition. In some embodiments, the food composition provided herein can have a beta glucan content of at least 0.6% (e.g., at least 0.7%, at least 0.75%, or at least 1%) by weight of the food composition. In some embodiments, fiber content of the food composition can be provided solely from one or more of the included milk ingredients, oats, fruit ingredient, sweetener, and inclusions. However, in some embodiments, fiber content of the food composition can include added fiber (e.g., wheat bran, oat bran, oat fiber, inulin, or the like).

Figure 3:
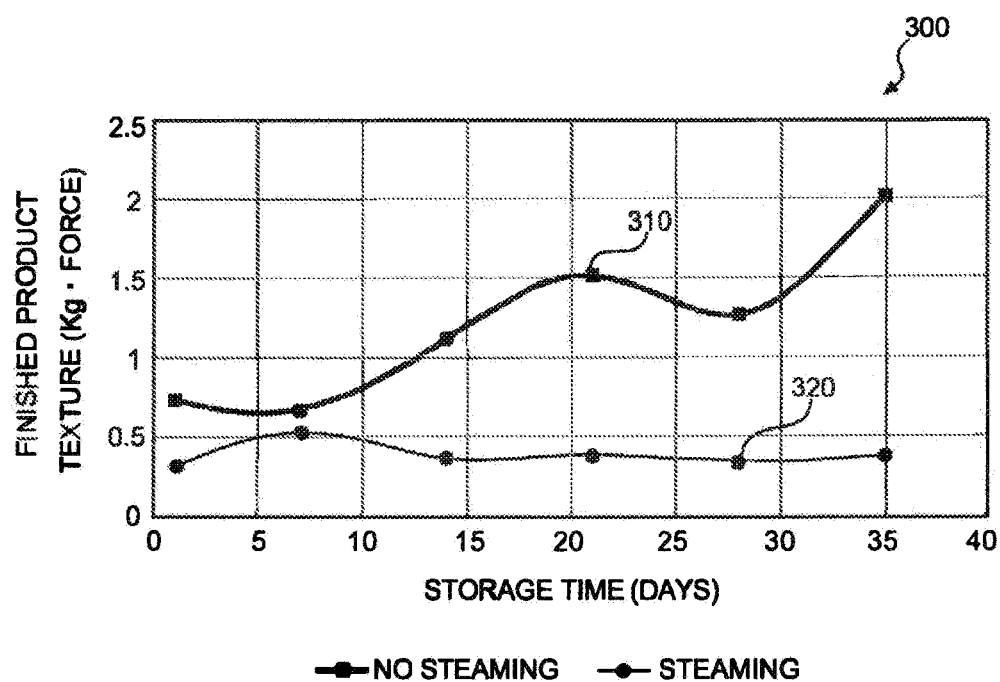
FIG. 3 is a graph comparing how overnight oat's texture changes over time for overnight oats with and without steam treatment.
Figure 4:
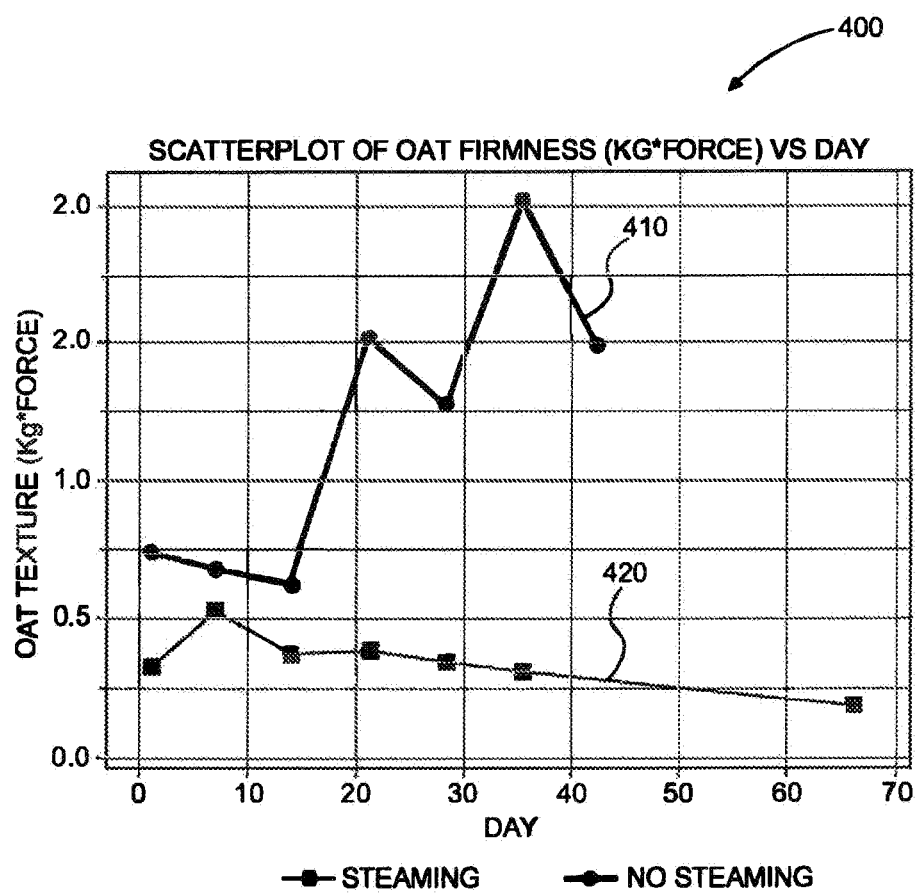
FIG. 4 is a graph comparing how overnight oat's texture changes over time for overnight oats with and without steam treatment for over 66 days.
Figure 5:
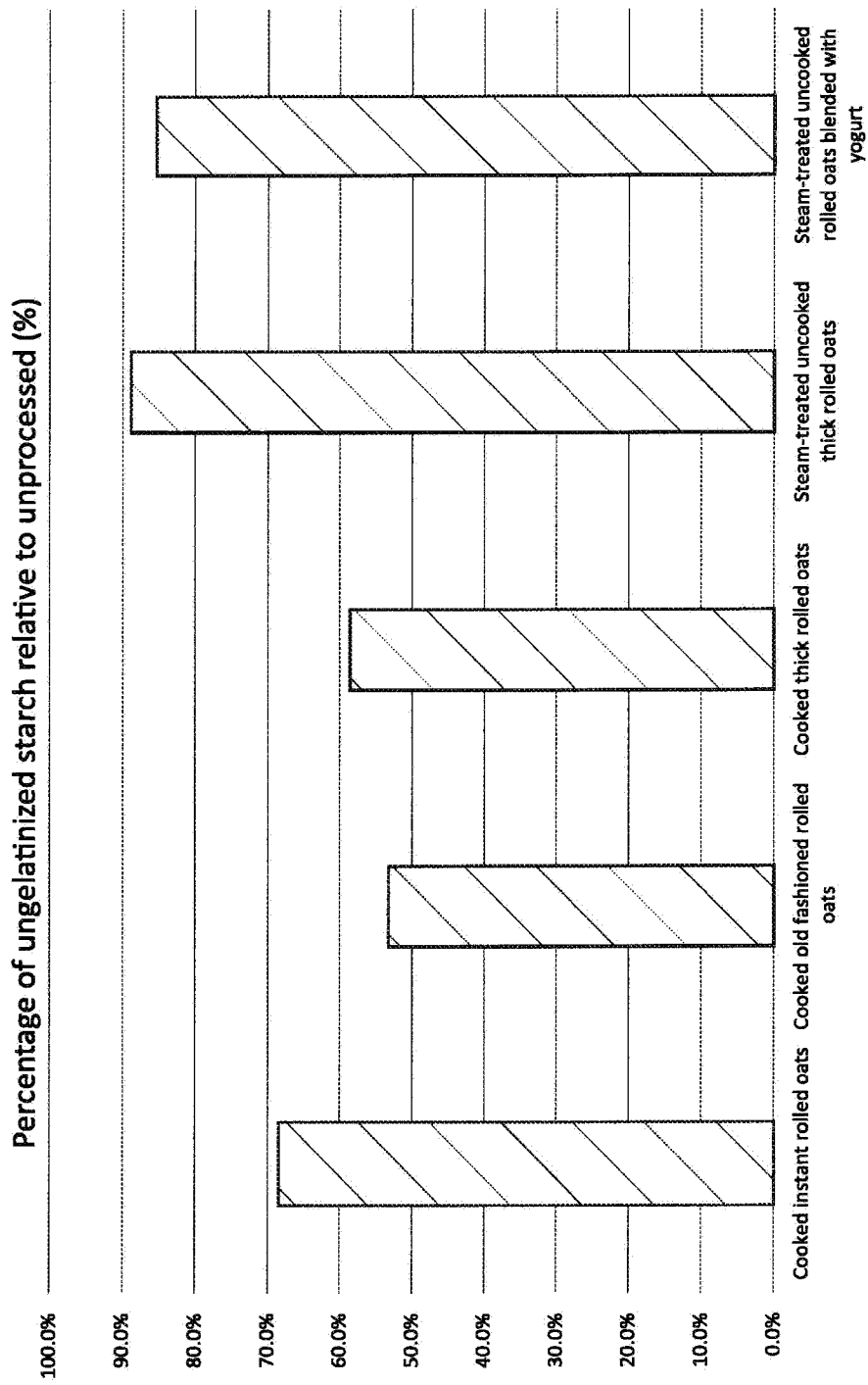
FIG. 5 is a graph comparing ungelatinized starch content in cooked rolled oats, steam-treated uncooked rolled oats, and steam-treated uncooked rolled oats after blending with yogurt.
Figure 6:
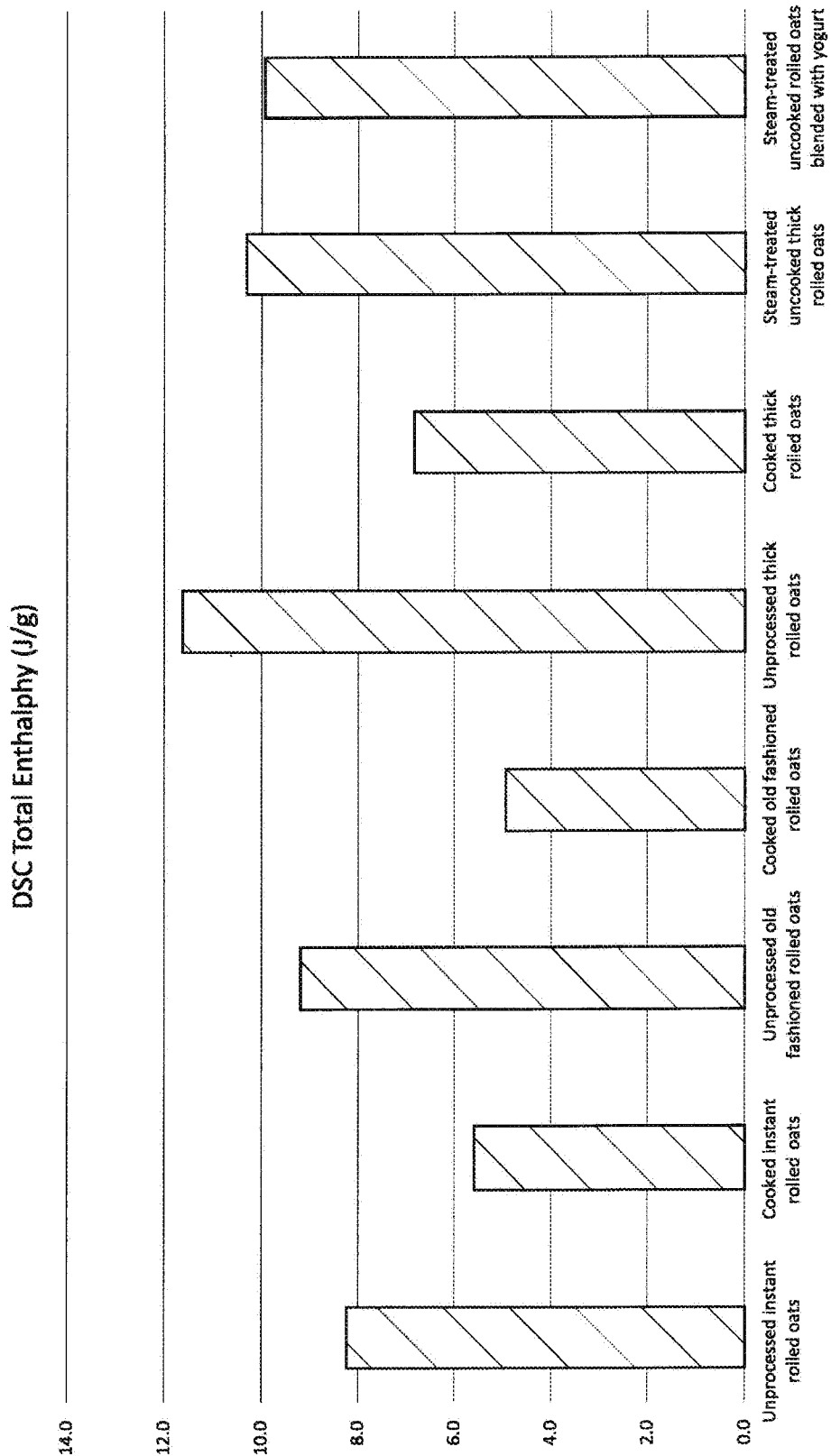
FIG. 6 is a graph comparing DSC total enthalpy of unprocessed rolled oats, cooked rolled oats, steam-treated uncooked rolled oats, and steam-treated uncooked rolled oats after blending with yogurt.

FIGS. 3, 4, and 5 are graphs that show the change in viscosity and texture over time in an embodiment of a food product containing oats and yogurt.

FIG. 3 shows a graph 300 comparing food composition texture in kg for a composition containing oats treated with steam 320 to a composition containing unprocessed oats 310 versus number of days the compositions are stored. The overnight oats containing oats subject to steaming 320 remain smooth with a texture under about 500 kg even at 35 days of storage, while the food composition containing the unprocessed oats 310 has a dramatic and undesirable increase in texture after day 10. As used herein, texture of a food composition (e.g., overnight oats) is measured by using the following method. A sample of the food composition is placed in a disposable cup having a 6 fluid ounce volume capacity and following dimensions: height of 71.04 mm, inner rim height of 60.38 mm, top diameter of 74.39 mm, and bottom diameter of 56.72 mm. The sample should fill the cup to the bottom rim without packing. The sample in the cup is subjected to texture analysis using a TA.XTplus texture analyzer (Stable Micro Systems, Surrey, United Kingdom, distributed by Texture Technologies in North America) fitted with a cylinder probe having a height of 35.32 mm, a diameter of 25.40 mm, and a bevel on the top edge using the following settings in Exponent software:

| Setting | Value | Units |
| --- | --- | --- |
| Test Mode | Compression | n/a |
| Pre-test speed | 10.00 | mm/sec |
| Test speed | 5.00 | mm/sec |
| Post-test speed | 10.00 | mm/sec |
| Target mode | Distance | n/a |
| Distance | 40.00 | mm |
| Trigger type | Auto (force) | n/a |
| Trigger force | 5.0 | g |
| Advanced options | Off | n/a | n/a = not applicable

Texture of the food composition is the peak positive force in kilograms.

FIG. 4 shows a graph 400 comparing oat texture in kg for overnight oats containing rolled oats treated with steam 420 to overnight oats containing rolled oats not treated with steam 410 versus number of days the overnight oats are stored. The overnight oats containing rolled oats subject to steaming 420 remain smooth with a texture under about 500 kg even at 66 days of storage, while the unprocessed oats 410 have a dramatic and undesirable increase in texture after day 10. As used herein, texture of grain (e.g., oats) in a food composition is measured by using the following method. A sample of grain is separated from a food composition by placing the food in a sieve that retains at least 90% of the grain content while allowing other food composition components to flow through (e.g., a #8 sized sieve). The sieve containing the food composition is dunked into a container of cold water, with care not to allow components of the food composition to flow above the rim of the sieve, and the food composition is agitated within the sieve (e.g., using a spatula) to gently rinse away food composition components from the grain. This is repeated as necessary, working quickly to reduce water absorption by the grain, until other components of the food composition are washed away from the grain. The grain is collected and excess water absorbed using a paper towel. A sample containing sufficient amount of the grain to fill a Mini Kramer Shear Cell attachment level with the top of the cell is placed in the Mini Kramer Shear Cell, noting the mass of the sample. Comparative samples should have approximately the same mass. The distance from the blade to the bottom of the mini Kramer shear cell is set at 96 mm, which is also the return distance once the probe has completed the analyzing cycle. The sample is subjected to analysis using a TA.XTplus texture analyzer (Stable Micro Systems, Surrey, United Kingdom, distributed by Texture Technologies in North America) with the following settings in Exponent software:

| Setting | Value | Units |
|---|---|---|
| Test Mode | Compression | n/a |
| Pre-test speed | 20.00 | mm/sec |
| Test speed | 2.00 | mm/sec |
| Post-test speed | 10.00 | mm/sec |
| Target mode | Distance | n/a |
| Distance | 25.000 | mm |
| Trigger type | Pre-travel | n/a |
| Trigger distance | 70.000 | mm |
| Break mode | Off | n/a |
| Stop plot at | Start position | n/a |
| Tare mode | Auto | n/a |
| Advanced options | On | n/a | n/a = not applicable

Firmness of the grain is the average force in kilograms measured over distance traveled by the probe from first registered 20 g force, passing the peak force, to 1 gram force as the end point. The results are normalized to a 10 g sample basis.

In some embodiments, the food product can include any other suitable food composition, such as a fruit preparation or a sauce (e.g., chocolate or caramel sauce). In some embodiments, the food composition can be repackaged to make a food product that may or may not include other food compositions. For example, a bulk packaged food composition can be used to fill cups along with a fruit preparation or toppings, such as nuts or granola, to make a food product, such as a parfait or sundae.

Methods of Manufacture

With reference to FIG. 1, there is shown the overall process flow 100 for producing the resulting product. While FIG. 1 discloses producing overnight oats as an example, it should be noted that other grains could be used instead of oats. Unprocessed oats are provided by an oat feeder 110. Oat feeder 110 has the capability to handle both flakes and steel-cut oats. Preferably, the starting oat moisture ranges from 7-13%, and is preferably about 9%.

After leaving oat feeder 110, the unprocessed oats are then moved to an optional oat blender 120, which blends the oats, if required. The unprocessed oats next are placed in an oat propeller 130, which has a steam injection feature and also a blending shaft. A steam generator 140 produces steam at various pressures and flow rates and introduces the steam into oat propeller 130. For example, the steam pressure can range from 15 psig to 45 psig at a temperature ranging from 103° C. to 135° C. and at a flow rate from about 0.1 to about 1 (e.g., 0.2 to 0.9, or 0.3 to 0.8) and preferably from about 0.2 to about 0.4 lb per minute. In one example, the steam is introduced at 45 psig, has an incoming temperature of about 135° C. and an outlet temperature of about 105° C. and flows at about 0.4 lb per minute through oat propeller 130. Alternatively, the steam is introduced at 15 psig, has an incoming temperature of about 105° C. and an outlet temperature of about 103° C. and flows at about 0.2 lb per minute through oat propeller 130. The residence time of the steam in propeller 130 is from 30 seconds to 12 minutes but is preferably less than 3 minutes. Oat propeller 130 has a shaft that rotates within a range of 1.8 to 15 rpm while pushing the oats through a steam treating zone. As the unprocessed oats pass through the steam, the unprocessed oats become steam-treated uncooked oats. Preferably, the moisture level of steam-treated uncooked oats ranges from 14 to 45%.

Unprocessed grains may have yeast and/or mold strains that are specific to each grain. For example, for oats, unprocessed Fridley Oats, with hull, may have molds such as *Cladosporium cladosporioides*, *Sarocladium* sp., or *Fusarium paoe*. These molds can be present at a relatively high microbial load of over $2 \times 10^5$ (e.g., over $2.5 \times 10^6$) colony-forming units (CFU)/g and even up to $3 \times 10^6$(CFU)/g. After being treated with the steam, the microbial load drops to below 10 CFU/g, before combining with a milk ingredient which results in a shelf-stable product. As used herein, a shelf-stable product refers to a product in which mold and yeast (as measured by U.S. Food and Drug Administration Laboratory Method BAM 18: Yeasts, Molds and Mycotoxins, April 2001), and coliform bacteria (as measured by U.S. Food and Drug Administration Laboratory Method BAM 4: Enumeration of *Escherichia coli* and the Coliform Bacteria, September 2002, as revised July 2017), are present at less than 10 CFU per gram over the designated time at the designated temperature.

The steam treated oats are then optionally sent through an enclosed tube 150 for cooling. Other enclosed equipment may be used for cooling, but the steam-treated oats are preferably not exposed to ambient conditions. Alternatively, the steam-treated oats are sent directly to mixer 160 since the cooling is optional. The steam treated oats then enter a mixer 160 where the steam-treated oats are mixed with a milk-based product, such as a yogurt base at 170.

In some embodiments, a milk ingredient can be made or processed prior to combining it with oats and any optional ingredients. For example, flavor injection may occur as indicated by reference numeral 180.

After leaving mixer 160, the mixed food product is passed to a filler 190 and a case packer 200. Filler 190 can place the mixed food product into a variety of packages. The product is then refrigerated. Any size or style of packaging can be used. Preferably, the packaging allows for a consumer to eat the overnight oats while travelling. Also, the packaging may allow for additional toppings to be added to the overnight oats. For example, bulk packaging, such as large bags or totes can be used, or individual serving size packages, pouches, such as cups, packets, or tubes can be used.

Figure 2:
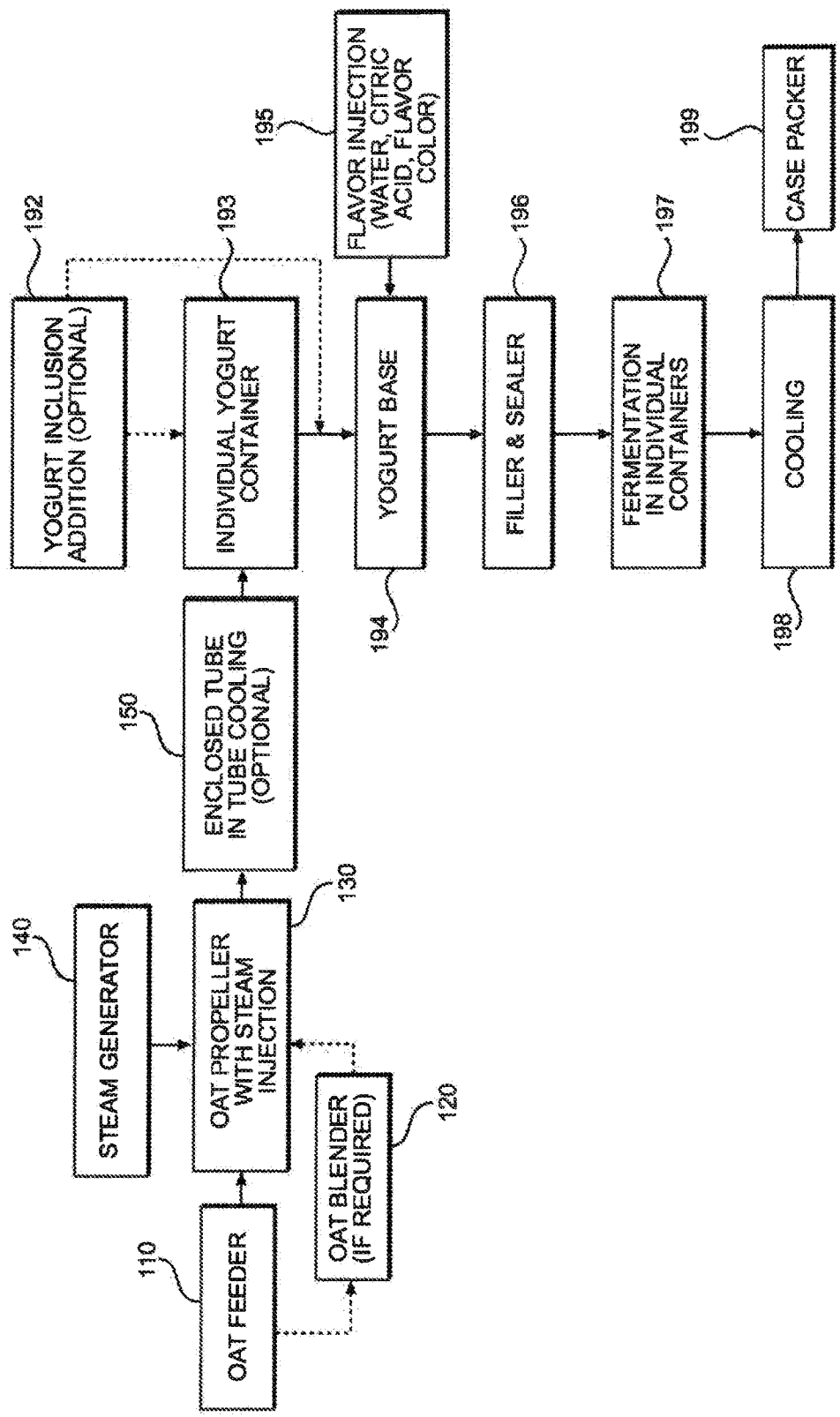
FIG. 2 is a schematic process flow diagram of one preferred embodiment of the present method of preparation with cup set yogurt.

An alternative embodiment is shown in FIG. 2, wherein cup set yogurt is employed. The first few steps in the process are the same as those mentioned above with regard to FIG. 1. Unprocessed oats are provided by feeder 110. After leaving the feeder 110, the unprocessed oats are then moved to an optional blender 120, which blends the oats, if required. The unprocessed oats are next placed in an oat propeller 130, which has a steam injection feature and also a blending shaft. A steam generator 140 produces steam at various pressures and flow rates and introduces the steam into oat propeller 130 to treat the oats. The steam-treated oats are then optionally sent through an enclosed tube 150 for cooling. After leaving propeller 130 or optional cooling tube 150, the process changes. In particular, the oats are placed in individual containers at 193. Optionally, additional inclusions may be added at 192. Then the yogurt base 194 is added to the container along with ingredients, such as water, citric acid, flavorings, and color at 195. After the individual containers are filled and sealed at 196, the yogurt is fermented in the individual containers at 197. This part of the process gives rise to the term "cup set." When fermentation is complete, the individual containers are cooled at 198, and optionally sent to a case packer 199.

Thus, embodiments of food compositions and food products containing grains and a milk ingredient, and methods of making and using such food compositions and food products are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation.

For purposes of the present invention, the term "about" adds a margin of error of +/−10%. Accordingly, a mass of about 1.00 kilograms includes masses between 0.90 and 1.10 kilograms. Similarly, a range of about 1.00-1.20 kilograms includes masses between 0.90 and 1.32 kilograms. For numerical values expressed as percentages, the margin of error refers to the base numerical value. In other words, "about 20%" means 18-22% and not 10-30%.

What is claimed is:

1. A method of making a refrigerated food product, the method comprising:
   treating a supply of unprocessed grains with steam to form steam-treated uncooked grains;
   mixing the steam-treated uncooked grains with a milk ingredient to form a food composition having about 1% to about 50% steam-treated uncooked grains by weight of the food composition; and
   refrigerating the food composition to form the refrigerated food product.

2. The method of claim 1, wherein the refrigerated food product has a shelf stability at 4° C. of at least 70 days.

3. The method of claim 1, wherein the grains comprise oats.

4. The method of claim 3, wherein the milk ingredient is yogurt.

5. The method of claim 1, wherein the food composition has a viscosity within a range of 20,000 to 40,000 cps, the viscosity staying within the range at least 35 days.

6. The method of claim 1, wherein the steam is supplied to the unprocessed grains at a flow rate in a range of about 0.2 to about 0.4 lb. per minute.

7. The method of claim 6, wherein the steam is supplied to the unprocessed grains at a temperature in a range of about 105° C. to about 135° C.

8. The method of claim 7, wherein the mixing step is performed in a blender with a blending shaft rotating in a range of about 1.8 to 15 rpm.

9. The method of claim 1, further comprising a microbial load in the steam-treated uncooked grains, wherein the microbial load in the steam-treated uncooked grains is below 10 CFU/g before mixing with the milk ingredient.

10. The method of claim 1, wherein the unprocessed grains are treated with steam just before the steam-treated uncooked grains are mixed with the milk ingredient.

11. The method of claim 1, further comprising placing the food composition in a package and wherein mixing the steam-treated uncooked grains with the milk ingredient causes the steam-treated uncooked grains to be about 5% to 25% by weight of the food composition.

12. A refrigerated food product comprising:
   a shelf-stable food composition including:
      a milk ingredient; and
      steam-treated uncooked grains, the steam-treated uncooked grains being about 1% to about 50% by weight of the food composition, wherein the food product is refrigerated.

13. The refrigerated food product of claim 12, wherein the food product has a shelf stability at 4° C. of at least 70 days.

14. The refrigerated food product of claim 12, wherein the steam-treated uncooked grains comprise oats having a thickness in a range of 0.25 mm to 1.8 mm.

15. The refrigerated food product of claim 14, wherein the milk ingredient comprises a yogurt.

16. The refrigerated food product of claim 15, wherein the food composition comprises from 50% to 99% yogurt by weight of the food composition.

17. The refrigerated food product of claim 12, wherein the food composition has a viscosity within a range of 20,000 to 40,000 cps, the viscosity staying within the range at least 35 days.

18. The refrigerated food product of claim 12, wherein the food composition further comprises 0.015 to 0.5% citric acid and has a pH of 4.6 or less.

19. The refrigerated food product of claim 12, wherein the food composition further includes up to 10% of a fruit ingredient or a nut ingredient by weight of the food composition.

20. The refrigerated food product of claim 12, wherein the steam-treated uncooked grains comprise oats having a protein content of at least 18% by weight of the oats and the steam-treated uncooked grains are about 5% to 25% by weight of the food composition.

* * * * *